United States Patent
Stucke, Jr. et al.

(10) Patent No.: US 7,603,505 B2
(45) Date of Patent: Oct. 13, 2009

(54) INTERACTIVE ELECTRONIC DEVICE WITH DIGITAL AND ANALOG DATA LINKS

(75) Inventors: Donald W. Stucke, Jr., East Aurora, NY (US); Kyle R. Bleyle, Alden, NY (US); Ray J. Cappello, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 155 days.

(21) Appl. No.: 11/995,559

(22) PCT Filed: Jul. 17, 2006

(86) PCT No.: PCT/US2006/027579

§ 371 (c)(1),
(2), (4) Date: Jan. 14, 2008

(87) PCT Pub. No.: WO2007/011823

PCT Pub. Date: Jan. 25, 2007

(65) Prior Publication Data

US 2008/0195784 A1    Aug. 14, 2008

Related U.S. Application Data

(60) Provisional application No. 60/699,474, filed on Jul. 15, 2005.

(51) Int. Cl.
*G09B 19/00* (2006.01)
*G09B 17/00* (2006.01)
*G06F 13/00* (2006.01)
*G09B 5/00* (2006.01)

(52) U.S. Cl. .................. 710/301; 434/178; 434/156; 434/308

(58) Field of Classification Search ........... 434/178, 434/156
See application file for complete search history.

(56) References Cited

U.S. PATENT DOCUMENTS 5,480,306 A * 1/1996 Liu ........................ 434/156

(Continued)

OTHER PUBLICATIONS

Texas Instruments Incorporated—TMS 5220 Voice Synthesis Processor Data Manual—32 pages—Jun. 1981.*

(Continued)

*Primary Examiner*—Mark Rinehart
*Assistant Examiner*—Brian T Misiura
(74) *Attorney, Agent, or Firm*—Panitch Schwarze Belisario & Nadel LLP

(57) ABSTRACT

An interactive electronic device having a master integrated circuit, an analog audio output device and a bus having a single-conductor digital data link and a single-conductor analog data link and a method for transmitting digital data and an associated analog signal are disclosed. The bus is configured to electrically simultaneously couple the master integrated circuit with any combination of a plurality of removable electronic cartridges arranged in any order in any of a plurality of removable cartridge connectors. The master integrated circuit transmits along the digital data link simultaneously to each of the removable cartridge connectors one identification code of a plurality of identification codes, the identification codes being different from any memory address in any of the removable cartridges. The analog data link simultaneously couples all of the removable cartridge connectors with the analog audio output device and transmits analog signal associated with the one identification code.

21 Claims, 3 Drawing Sheets

U.S. PATENT DOCUMENTS

| | | | |
|---|---|---|---|
| 5,689,823 A * | 11/1997 | Phillips | 455/575.1 |
| 5,695,345 A * | 12/1997 | Weiner et al. | 434/317 |
| 5,945,656 A * | 8/1999 | Lemelson et al. | 235/462.01 |
| 6,556,628 B1 | 4/2003 | Poulton et al. | |
| 2002/0197589 A1* | 12/2002 | Wood et al. | 434/201 |
| 2004/0043365 A1* | 3/2004 | Kelley et al. | 434/178 |
| 2005/0120778 A1 | 6/2005 | Von Herzen et al. | |

OTHER PUBLICATIONS

Sonix Technologies Co.—SNC710 16-bit Voice Engine—16 pages—Apr. 3, 2003.*

Sonix Technologies Co.—SNR016 16-bit Mask ROM—9 pages—Oct. 21, 2005.*

\* cited by examiner

INTERACTIVE ELECTRONIC DEVICE WITH DIGITAL AND ANALOG DATA LINKS

CROSS-REFERENCE TO RELATED APPLICATIONS

This application is filed under 35 U.S.C. 371, based on and claiming the benefit of International Patent Application No. PCT/US2006/027579, with an international filing date of Jul. 17, 2006, designating the United States and published in the English language as International Publication No. WO 2007/011823 A2, which International Patent Application, in turn, claims the benefit of U.S. Provisional Patent Application No. 60/699,474, filed Jul. 15, 2005. Each of the above-identified related applications is incorporated herein by reference.

BACKGROUND OF THE INVENTION

The present invention relates to an interactive electronic device having a bus with digital and analog data links and a method for transmitting digital data and an associated analog signal along the bus when any of a plurality of removable electronic cartridges is operatively coupled to the bus.

Interactive electronic devices, and more particularly, handheld interactive consumer electronic devices used for learning and amusement typically have digital signal processing architectures with a limited amount of internal memory which at best may be expanded with memory cartridges removably receivable in externally accessible cartridge slots. By use of the removable memory cartridges, additional software programs and associated data may be added to expand the functional capabilities of the devices. One example of such a device is the Super Speak & Read™ manufactured by Texas Instruments Inc., Dallas, Tex. The Super Speak & Read is an interactive book system with a base that is configured as a folding book that allows a child to activate speech and sounds by touching language symbols and images in multipage activity books that are removably insertable in a book area in the base. The speech and sounds are synthesized from audio data stored in digital memory in the base unit and may be augmented with additional memory cartridges that are insertable in one of two external cartridge slots in the base unit.

As consumers have become accustomed to increasingly sophisticated, feature laden interactive devices with high quality audio and video user interfaces, substantial amounts of data at increasingly higher data rates must be transmitted from the external cartridges to the system electronics. Typically, such data transfers occur over a digital interface resulting in a substantial increase in the unit cost of both the cartridges and the devices themselves.

In certain applications, analog transmission of audio signals is potentially more cost effective than current digital methods and may allow manufactures of interactive electronic devices in the consumer electronics market to achieve a lower price point.

Accordingly, there is a need in the art for interactive electronic devices and, more particularly, for hand held interactive electronic devices used for learning and amusement to have the capability of providing external removable memory cartridges that operatively couple to the device by both a digital and analog data links.

BRIEF SUMMARY OF THE INVENTION

Briefly stated, one embodiment of the present invention is directed to an interactive electronic device operable with any of a plurality of removable electronic cartridges. The device comprises a master integrated circuit, an analog audio output device, and a bus. The bus has a plurality of removable cartridge connectors, each removable cartridge connector configured to removably receive any of the plurality of removable electronic cartridges. The bus is configured to electrically simultaneously couple the master integrated circuit with any combination of the plurality of removable electronic cartridges arranged in any order in any of the plurality of removable cartridge connectors. The bus comprises a single-conductor digital data link and a single-conductor analog data link. The digital data link configured to electrically simultaneously couple the master integrated circuit with all of the removable cartridge connectors. The analog data link configured to simultaneously couple all of the removable cartridge connectors with the analog audio output device. The master integrated circuit is configured to transmit along the digital data link simultaneously to each of the removable cartridge connectors one identification code of a plurality of identification codes, the identification codes being different from any memory address in any of the removable cartridges.

Another embodiment of the present invention is directed to a method for transmitting digital data and an associated analog signal. The method comprises the steps of: coupling a master integrated circuit to a data bus having a plurality of removable electronic cartridge connectors, each connector configured to removably receive any of a plurality of removable electronic cartridges, the bus comprising a single-conductor digital data link and a single-conductor analog data link, the digital data link configured to electrically simultaneously couple the master integrated circuit with all of the removable electronic cartridge connectors, the analog data link configured to simultaneously couple all of the removable electronic cartridge connectors with an analog audio output device; coupling the analog audio output device to the single-conductor analog data link; coupling simultaneously any combination of the plurality of removable electronic cartridges to the bus, the any combination arranged in any order in any of the plurality of removable electronic cartridge connectors; transmitting along the digital data link simultaneously to each of the removable electronic cartridge connectors one identification code of a plurality of identification codes from the master integrated circuit to the any combination, the identification codes being different from any memory address in any of the removable cartridges; and transmitting along the audio data link an audio signal from one removable electronic cartridge of the any combination.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
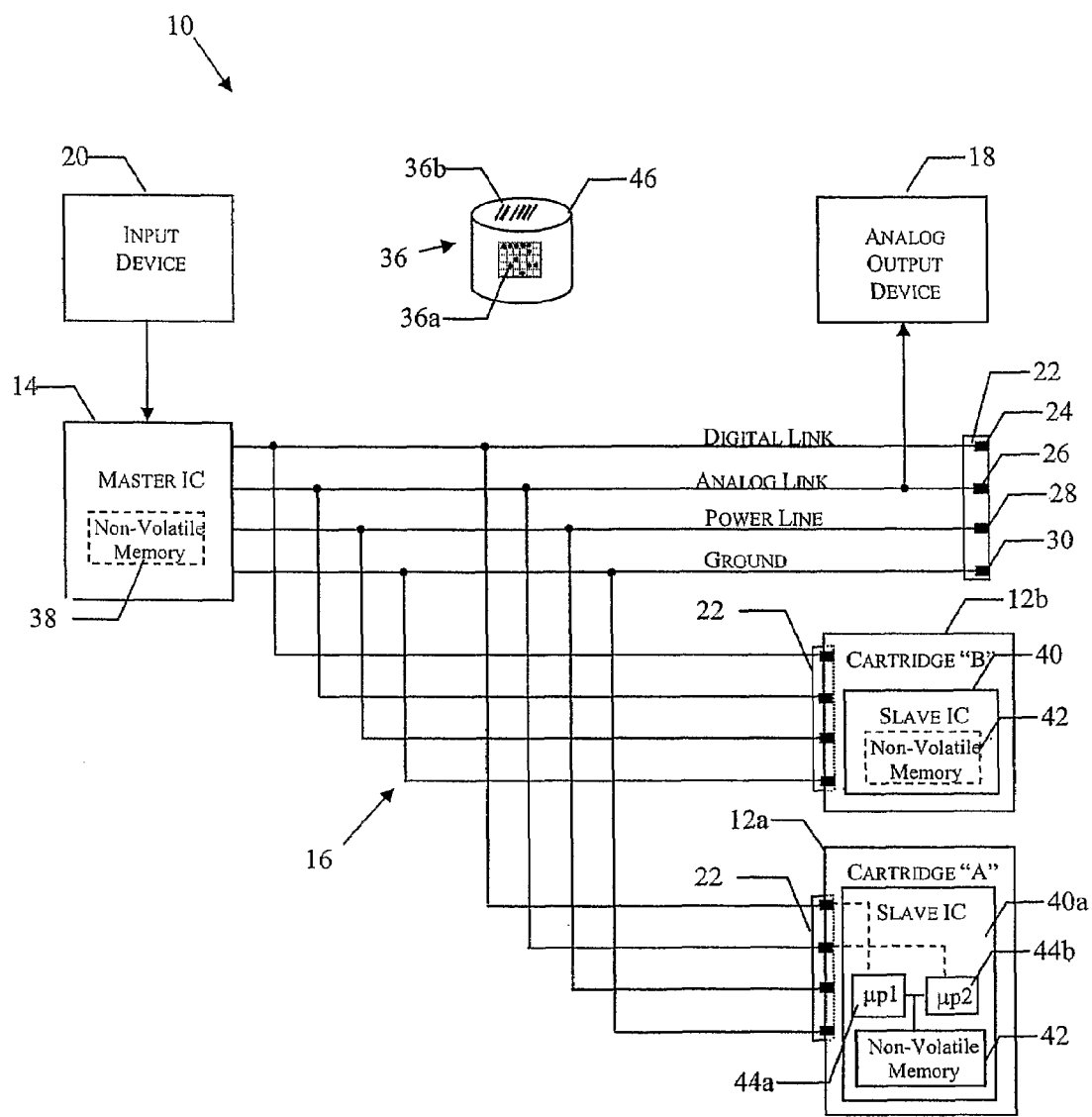
FIG. 1 is a schematic block diagram of a first preferred embodiment of the interactive electronic device in accordance with the present invention.

Referring to the drawings in detail, where like numerals indicate like elements throughout, there is shown in FIG. 1 a first preferred embodiment of the interactive electronic device generally designated 10, and hereinafter referred to as the "IED" 10 in accordance with the present invention. The IED 10 is an interactive electronic device that is operable with any of a plurality of removable electronic cartridges 12. The IED 10 comprises a master integrated circuit 14, a bus 16, and an analog output device 18. The IED 10 may also have an input device 20.

The bus 16 has a plurality of removable cartridge connectors 22. Each removable cartridge connector 22 is configured to removably receive any of the plurality of removable electronic cartridges 12. The bus 16 is configured to electrically simultaneously couple the master integrated circuit 14 with any combination of the plurality of removable electronic cartridges 12 arranged in any order in any of the plurality of removable cartridge connectors 22. The bus 16 comprises a single-conductor digital data link 24 and a single-conductor analog data link 26. The digital data link 24 is configured to electrically simultaneously couple the master integrated circuit 14 with all of the removable cartridge connectors 22. The analog data link 26 is configured to simultaneously couple all of the removable cartridge connectors 22 with the analog audio output device 18. The analog data link 26 may also be configured to couple the master integrated circuit with the analog audio output device 18. The bus 16 may also have a power conductor 28 that may be coupled to a power source, such as a battery, and a ground conductor 30 that may be coupled to a common ground for all components of the IED 10.

Figure 2:
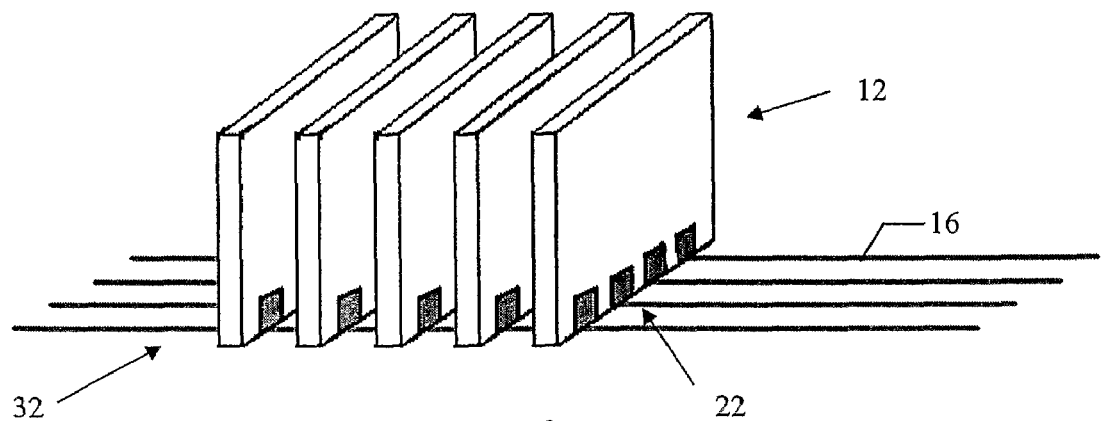
FIG. 2 is an abstract block diagram showing the bus and connectors of the device of FIG. 1 in a generally linear layout.
Figure 3:
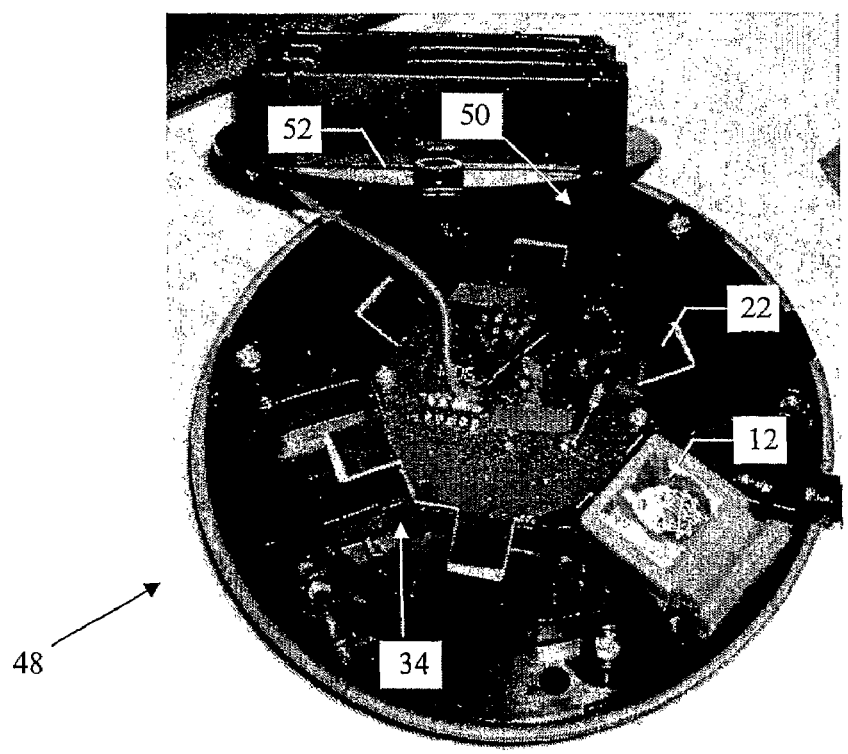
FIG. 3 is a bottom perspective view of a preferred embodiment of a housing with an enclosure, in an open configuration, containing the bus, connectors, and one of the removable electronic cartridges of the device of FIG. 1 in a generally circular layout.

The bus 16 and the plurality of removable cartridge connectors 22 may have a wide variety of physical layouts. For example, the bus 16 and connectors 22 may have a generally linear layout 32 as shown in FIG. 2, or a generally circular layout 34 as shown in FIG. 3. Alternatively, the physical layout of the bus 16 and the connectors 22 may assume the shape of an arbitrarily positioned cable bundle (not shown) or may assume the shape of any predetermined routing scheme.

The single conductors comprising the digital data link 24 and the analog data link 26 may be formed from any conducting material. For example, the conductors may be single or multiple strands of wire. The conductors may also be metal traces on a printed circuit board. The plurality of removable cartridge connectors 22 may be any of a wide variety of connectors that are well known in the electrical arts including, but not limited to, pin and socket connectors and edge connectors.

The master integrated circuit 14 is configured to transmit along the digital data link 24 simultaneously to each of the removable cartridge connectors 22 one identification code of a plurality of identification codes 36. The master integrated circuit 14 may further comprise non-removable preprogrammed non-volatile memory 38 having stored therein audio data associated with at least another identification code of the plurality of identification codes 36. An SNC710 manufactured by Sonix Technologies Co., Ltd, Taipei, Taiwan is a representative example of a typical master integrated circuit 14. A SNR016 also manufactured by Sonix is a representative example of a typical non-volatile memory 38 associated with the master integrate circuit 14.

The master integrated circuit 14 may be configured to cause an analog signal corresponding to the audio data associated with the at least another identification code to be output to the analog data link 26 if the one identification code is the at least another identification code and to cause the one identification code to be transmitted along the digital data link 24 if the one identification code is not the at least another identification code.

The non-volatile memory 38 of the master integrated circuit 14 may have stored therein a master identification code reference table including the at least another identification code and a pointer indicating a memory address for the audio data associated with the at least another identification code. The master integrated circuit 14 may determine whether the one identification code is the at least another identification code by reference to the cartridge identification code reference table.

Each removable electronic cartridge 12a, 12b of the plurality of removable electronic cartridges 12 may have a slave integrated circuit 40 including preprogrammed non-volatile slave integrated circuit memory 42 having stored therein audio data associated with at least one identification code of the plurality of identification codes 22. A SNB1xx manufactured by Sonix Technologies Co., Ltd, Taipei, Taiwan is representative example of a typical slave integrated circuit.

The slave integrated circuit 40 of each removable electronic cartridge of the any combination may be configured to cause to be transmitted along the analog data link 26 an analog signal corresponding to the audio data associated with the at least one identification code when the slave integrated circuit 40 determines that the one identification code is the at least one identification code.

The slave integrated circuit 40 may have a slave identification code reference table including the at least one identification code and a pointer indicating a memory address for the audio data associated with the at least one identification code. The slave integrated circuit 40 determines whether the one identification code is the at least one identification code by reference to the cartridge identification code reference table.

A slave integrated circuit 40a of at least one of the removable electronic cartridges 12a may comprise a first processor 44a operatively coupled to the digital data link 24 and a second processor 44b in electrically communication with the first processor 44a and operatively coupled to the analog data link 26. Such a configuration allows the first processor 44a to process all transmissions on the digital data link 24 and allows the second processor 44b to process all analog signal transmissions originating in with the slave integrated circuit 40a on the analog data link 26.

The identification codes 36 are different from any memory address in any of the removable cartridges 12. Preferably, each identification code 36a, 36b of the plurality of identification codes 36 is on a substrate associated with an object 46. The identification codes 36 may be any marking or structure appearing on or associable with a tangible medium or physical object that is recognizable by a person or readable by a device and able to be transformed into a form that may manipulated by an integrated circuit and stored in electronic memory. For example, the identification codes 36 may be a pattern of wide and narrow spaces, dots, lines, or any layout of shapes and spaces. In a preferred embodiment, the identification codes 36 may be alphanumeric characters or hexadecimal numbers and may be represented by one or two dimensional barcodes.

The input device 20 is operatively coupled to the master integrated circuit, and is configured to send the one identification code to the master integrated circuit. In one embodiment, the input device 20 may be a keyboard (not shown) by which a human may manually input the one identification code 36a, 36b. In another embodiment, the input device 20 comprises a reader able to detect the identification code. The input device may be any device capable of being operatively coupled to the master integrated circuit 14 and capable of sending to the master integrated circuit 14 a form of the identification codes 36 that may be recognized and manipulated by an integrated circuit. For example, the input device 20 may be a typical computer keyboard by which a person enters visually perceptible codes. Alternatively, the input device 20 may be a scanner if the codes are optical, such as one or two dimensional bar codes either visible or invisible, or an electro-magnetic reader if the codes have an electro-magnetic signature such as radio frequency identification (RFID) tags.

The audio data associated with at least one of the identification codes 36a, 36b may represent a wide variety of sounds. For example, the audio data may be the name of a geometric object, such as a cube or cylinder. If the object is a print media, such as the page of a book, the audio data may represent the pronunciation of a word, letter, or number appearing on the page. The audio data may also be a fact associated with an object, a special sound effect, or music. The scope of the audio data associated with an identification code is not intended to be limiting. The audio data is stored in memory as a digital file and is converted to an analog signal by the slave integrated circuit 40 of the removable electronic cartridge 12 in which it is stored.

Referring to FIG. 3, IED 10 may comprise a housing 48 containing the master integrated circuit 14 and the bus 16. The housing 48 having an accessible enclosure 50 containing the plurality of removable cartridge connectors 22 with the any combination of the plurality of removable electronic cartridges 12 coupled thereto. The enclosure 50 may have a removable cover 52 providing access to the enclosure 50 and also protecting the master integrated circuit 14, bus 16 and removable cartridges 12 when the cover 20 is secured in place. The analog audio output device 18 may be a speaker assembly (not shown) supported within the housing 48. Alternatively, the analog output device 18 may be an external device, such as ear phones, operatively connectable to the IED 10 by an audio port (not shown).

Figure 4:
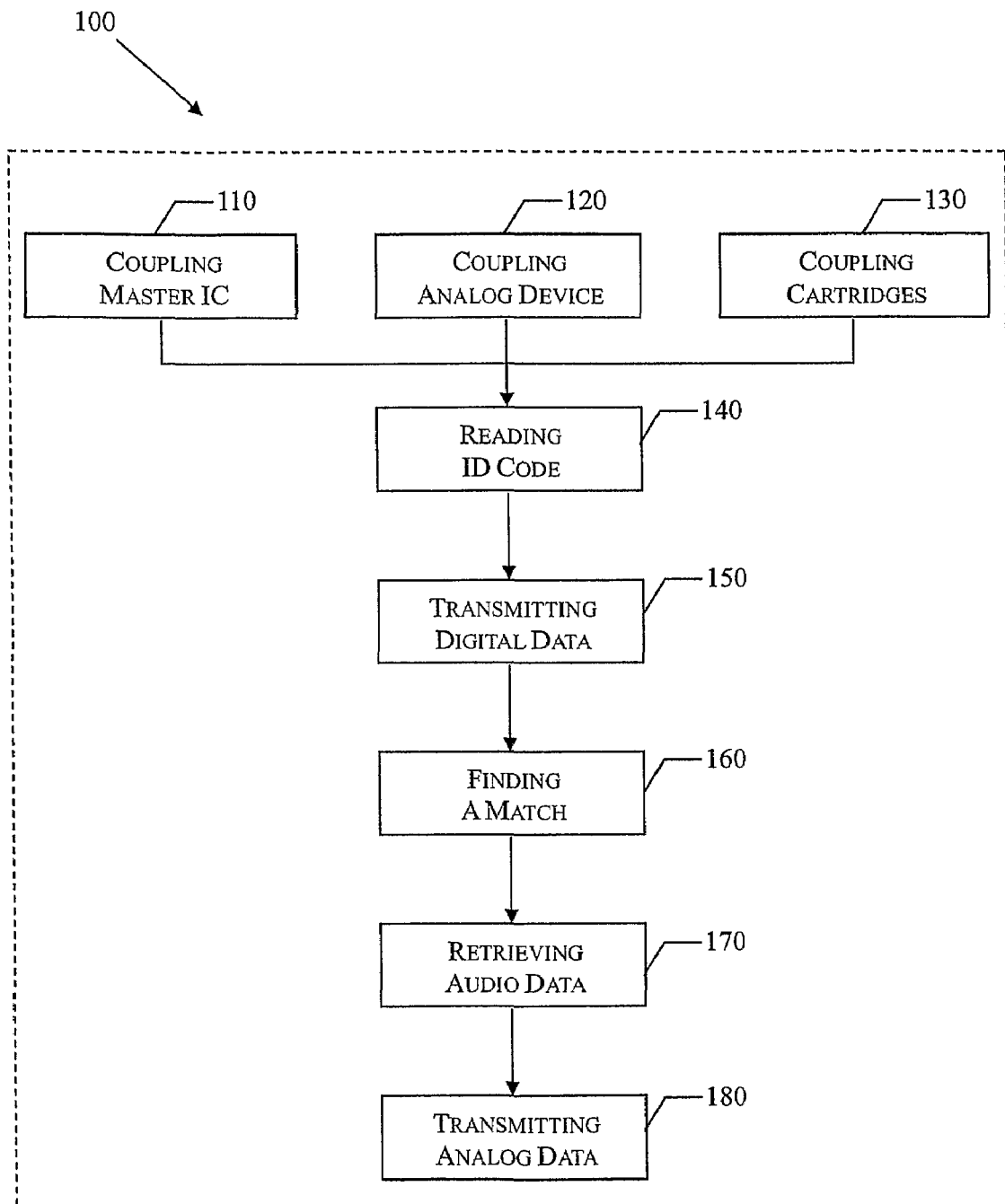
FIG. 4 is a flow diagram of a preferred embodiment of the method for transmitting digital data and an associated analog signal in accordance with the present invention.

Referring to FIG. 4, another embodiment of the present invention is directed to a method for transmitting digital data and an associated analog signal generally designated 100 and hereafter referred to as the "DA" 100. The DA 100 comprises at least three coupling steps and two transmitting the steps, each of which is discussed below with reference to the structure of the preferred embodiment disclosed above. However, the disclosed structure is not intended to be limiting.

In step 110, a master integrated circuit 14 is coupled to a data bus 16 having a plurality of removable electronic cartridge connectors 22. Each connector 22 is configured to removably receive any of a plurality of removable electronic cartridges 12. The bus 16 comprises a single-conductor digital data link 24 and a single-conductor analog data link 26. The digital data link 24 is configured to electrically simultaneously couple the master integrated circuit 14 with all of the removable electronic cartridge connectors 22. The analog data link 26 is configured to simultaneously couple all of the removable electronic cartridge connectors 22 with an analog audio output device 18. The master integrated circuit 14 preferably, but no necessarily, also is coupled to the analog data link 26.

In step 120, the analog audio output device 18 is coupled to the single-conductor analog data link 26.

In step 130, any combination of the plurality of removable electronic cartridges 12 is simultaneously coupled to the bus 16. Preferably, and more particularly, each removable electronic cartridge 12 may comprise a slave integrated circuit 40 which is coupled to the bus 16. The any combination may be arranged in any order in any of the plurality of removable electronic cartridge connectors 22.

In step 140, one identification code 36a, 36b of the plurality of identification codes 36 is read with an input device 20 operatively coupled to the master integrated circuit 14.

In step 150, the one identification code 36a, 36b of a plurality of identification codes 36 is transmitted along the digital data link 24 simultaneously to each of the removable electronic cartridge connectors 22 from the master integrated circuit 14 to the any combination of the plurality of removable electronic cartridges 12. The identification codes are different from any memory address in any of the removable cartridges.

In step 180, an audio signal from one removable electronic cartridge of the any combination is transmitted along the audio data link. In a preferred embodiment, step 180 further comprises finding with a slave integrated circuit 40 of one removable electronic cartridge 12 of the any combination a match between the one identification code and at least one identification code preprogrammed in a slave identification code reference table in non-volatile memory 42 of the slave integrated circuit 40 and retrieving from the non-volatile memory 42 the audio data associated with the at least one identification code and stored at a memory address indicated by a pointer in the slave identification code reference table.

Those skilled in the art will appreciate that changes could be made to the embodiments described above without departing from the broad inventive concept thereof. Therefore, the interactive electronic device with digital and analog data links and the method for transmitting digital data and an associated analog signal are not limited to the particular embodiments disclosed, but it is intended to cover modifications within the spirit and scope of the present invention as defined by the appended claims.

All references and patent applications mentioned above are incorporated herein by reference in their entirety and are not to be construed as an admission that any of the of the cited documents constitutes prior art, or as an admission against interest in any manner.

We claim:

1. An interactive electronic device operable with any of a plurality of removable electronic cartridges, the device comprising:
    a master integrated circuit;
    an analog audio output device; and
    a bus having a plurality of removable cartridge connectors, each removable cartridge connector configured to removably receive any of the plurality of removable electronic cartridges, the bus configured to electrically simultaneously couple the master integrated circuit with any combination of the plurality of removable electronic cartridges arranged in any order in any of the plurality of removable cartridge connectors, the bus comprising a single-conductor digital data link and a single-conductor analog data link, the digital data link configured to electrically simultaneously couple the master integrated circuit with all of the removable cartridge connectors, the analog data link configured to simultaneously couple all of the removable cartridge connectors with the analog audio output device, wherein the master integrated circuit is configured to transmit along the digital data link simultaneously to each of the removable cartridge connectors one identification code of a plurality of identification codes, the identification codes being different from any memory address in any of the removable cartridges.

2. The interactive electronic device according to claim 1, further comprising an input device operatively coupled to the master integrated circuit, the input device configured to send the one identification code to the master integrated circuit.

3. The interactive electronic device according to claim 2, wherein the input device is a keyboard by which a human may manually input the one identification code.

4. The interactive electronic device according to claim 2, wherein the each identification code of the plurality of identification codes is on a substrate associated with an object and the input device comprises a reader able to detect the identification code.

5. The interactive electronic device according to claim 2, wherein analog data link is further configured to couple the master integrated circuit with the analog audio output device.

6. The interactive electronic device according to claim 5, wherein the master integrated circuit further comprises non-removable preprogrammed non-volatile memory having stored therein audio data associated with at least another identification code of the plurality of identification codes, and the master integrated circuit is configured to cause an analog signal corresponding to the audio data associated with the at least another identification code to be output to the analog data link if the one identification code is the at least another identification code and to cause the one identification code to be transmitted along the digital data link if the one identification code is not the at least another identification code.

7. The interactive electronic device according to claim 6, wherein non-volatile memory of the master integrated circuit has stored therein a master identification code reference table including the at least another identification code and a pointer indicating a memory address for the audio data associated with the at least another identification code and the master integrated circuit determines whether the one identification code is the at least another identification code by reference to the cartridge identification code reference table.

8. The interactive electronic device according to claim 1, further comprising the plurality of removable electronic cartridges, each removable electronic cartridge having a slave integrated circuit including preprogrammed non-volatile memory having stored therein audio data associated with at least one identification code of the plurality of identification codes, wherein any combination of the plurality of removable electronic cartridges is connected to the bus and arranged in any order in any of the plurality of removable cartridge connectors.

9. The interactive electronic device according to claim 8, wherein the slave integrated circuit of at least one of the removable electronic cartridges comprises a first processor operatively coupled to the digital data link and a second processor in electrically communication with the first processor, the second processor operatively coupled to the analog data link.

10. The interactive electronic device according to claim 9, wherein the slave integrated circuit of each removable electronic cartridge of the any combination is configured to cause to be transmitted along the analog data link an analog signal corresponding to the audio data associated with the at least one identification code when the slave integrated circuit determines that the one identification code is the at least one identification code.

11. The interactive electronic device according to claim 10, wherein the slave integrated circuit has a slave identification code reference table including the at least one identification code and a pointer indicating a memory address for the audio data associated with the at least one identification code and the slave integrated circuit determines whether the one identification code is the at least one identification code by reference to the cartridge identification code reference table.

12. The interactive electronic device according to claim 11, wherein the analog data link is further configured to couple the master integrated circuit with the analog audio output device.

13. The interactive electronic device according to claim 12, further comprising an input device operatively coupled to the master integrated circuit, the input device configured to send the one identification code to the master integrated circuit.

14. The interactive electronic device according to claim 13, wherein the master integrated circuit further comprises non-removable preprogrammed non-volatile memory having stored therein audio data associated with at least another identification code of the plurality of identification codes, and the master integrated circuit is configured to cause an analog signal corresponding to the audio data associated with the at least another identification code to be transmitted along the analog data link if the one identification code is the at least another identification code and to cause the one identification code to be transmitted along the digital data link if the one identification code is not the at least another identification code.

15. The interactive electronic device according to claim 14, further comprising a housing containing the master integrated circuit and the bus, the housing having an accessible enclosure containing the plurality of removable cartridge connectors with the any combination of the plurality of removable electronic cartridges coupled thereto.

16. The interactive electronic device according to claim 15, wherein the plurality of removable cartridge connectors with the any combination of the plurality of removable electronic cartridges coupled thereto is arranged in a generally linear configuration.

17. The interactive electronic device according to claim 15, wherein the plurality of removable cartridge connectors with the any combination of the plurality of removable electronic cartridges coupled thereto is arranged in a generally circular configuration.

18. A method for transmitting digital data and an associated analog signal comprising:

coupling a master integrated circuit to a data bus having a plurality of removable electronic cartridge connectors, each connector configured to removably receive any of a plurality of removable electronic cartridges, the bus comprising a single-conductor digital data link and a single-conductor analog data link, the digital data link configured to electrically simultaneously couple the master integrated circuit with all of the removable electronic cartridge connectors, the analog data link configured to simultaneously couple all of the removable electronic cartridge connectors with an analog audio output device;

coupling the analog audio output device to the single-conductor analog data link;

coupling simultaneously any combination of the plurality of removable electronic cartridges to the bus, the any combination arranged in any order in any of the plurality of removable electronic cartridge connectors;

transmitting along the digital data link simultaneously to each of the removable electronic cartridge connectors one identification code of a plurality of identification codes from the master integrated circuit to the any combination, the identification codes being different from any memory address in any of the removable cartridges; and transmitting along the audio data link an audio signal from one removable electronic cartridge of the any combination.

19. The method of claim 18, wherein the coupling the master integrated circuit step further comprises coupling the master integrated circuit to the analog data link, and the method further comprising the step of reading the one identification code with an input device operatively coupled the master integrated circuit.

20. The method of claim 18, wherein the coupling simultaneously any combination step further comprises coupling a slave integrated circuit in each removable electronic cartridge of the any combination to the bus.

21. The method of claim 20, wherein the transmitting along an analog data link further comprises finding with the slave integrated circuit of one removable electronic cartridge of the any combination a match between the one identification code and at least one identification code preprogrammed in a slave identification code reference table in non-volatile memory of the slave integrated circuit and retrieving from the non-volatile memory the audio data associated with the at least one identification code and stored at a memory address indicated by a pointer in the slave identification code reference table.

* * * * *